(12) United States Patent
Wu

(10) Patent No.: US 12,038,811 B2
(45) Date of Patent: Jul. 16, 2024

(54) MEMORY CONTROLLER AND DATA PROCESSING METHOD

(71) Applicant: Silicon Motion, Inc., Hsinchu County (TW)

(72) Inventor: Po-Wei Wu, New Taipei (TW)

(73) Assignee: Silicon Motion, Inc., Hsinchu County (TW)

(*) Notice: Subject to any disclaimer, the term of this patent is extended or adjusted under 35 U.S.C. 154(b) by 40 days.

(21) Appl. No.: 18/072,725

(22) Filed: Dec. 1, 2022

(65) Prior Publication Data
US 2023/0185667 A1    Jun. 15, 2023

(30) Foreign Application Priority Data

Dec. 13, 2021 (TW) ................................ 110146502

(51) Int. Cl.
    *G06F 11/00*      (2006.01)
    *G06F 3/06*      (2006.01)
    *G06F 11/10*      (2006.01)

(52) U.S. Cl.
CPC ........ *G06F 11/1088* (2013.01); *G06F 3/0619* (2013.01); *G06F 3/0629* (2013.01); *G06F 3/0679* (2013.01); *G06F 11/10* (2013.01); *G06F 11/1004* (2013.01); *G06F 11/1048* (2013.01)

(58) Field of Classification Search
CPC .. G06F 11/10; G06F 11/1004; G06F 11/1048; G06F 11/1088
See application file for complete search history.

(56) References Cited

U.S. PATENT DOCUMENTS

| | | | | |
|---|---|---|---|---|
| 4,942,579 A * | 7/1990 | Goodlander | ....... | G11B 20/1833 714/E11.034 |
| 5,592,612 A * | 1/1997 | Birk | .................. | G11B 20/1803 714/6.24 |
| 5,623,595 A * | 4/1997 | Bailey | ................. | G06F 11/1076 714/764 |
| 6,041,423 A * | 3/2000 | Tsukerman | ......... | G06F 11/1076 714/E11.034 |
| 7,900,125 B1 * | 3/2011 | Liu | ..................... | H03M 13/453 714/760 |

(Continued)

FOREIGN PATENT DOCUMENTS

| | | |
|---|---|---|
| TW | I327320 | 7/2010 |
| TW | 201535382 A | 9/2015 |

*Primary Examiner* — Joshua P Lottich
(74) *Attorney, Agent, or Firm* — Winston Hsu

(57) ABSTRACT

A memory controller includes an error correction code engine, a buffer memory and a microprocessor. In response to a first decoding result of predetermined data, the microprocessor performs a repeated read operation on a memory device to obtain multiple read results of a data chunk having the predetermined data. The data chunk includes multiple bits. The microprocessor further performs a data reconstruction and error correction procedure according to the read results of the data chunk. In an operation of data reconstruction, the microprocessor determines a bit value corresponding to each bit in the data chunk according to the read results of the data chunk to generate a reconstructed data chunk. In an operation of error correction, the microprocessor provides the reconstructed data chunk to the error correction code engine to obtain a second decoding result of the predetermined data.

12 Claims, 4 Drawing Sheets

(56) References Cited

U.S. PATENT DOCUMENTS

| | | | |
|---|---|---|---|
| 9,189,334 B2 | 11/2015 | Bennett | |
| 9,841,908 B1 * | 12/2017 | Zhao | G06F 3/0611 |
| 9,905,289 B1 * | 2/2018 | Jeon | G11C 16/26 |
| 10,248,487 B1 * | 4/2019 | Garg | G06F 11/0757 |
| 10,621,036 B2 | 4/2020 | Son | |
| 10,990,477 B2 | 4/2021 | Gherman | |
| 2014/0136918 A1 * | 5/2014 | Katagiri | H03M 13/3715 |
| | | | 714/755 |
| 2014/0136919 A1 * | 5/2014 | Katagiri | H03M 13/293 |
| | | | 714/755 |
| 2016/0012916 A1 * | 1/2016 | Hara | G11C 29/50004 |
| | | | 365/185.11 |
| 2016/0055054 A1 * | 2/2016 | Patterson, III | G06F 3/0619 |
| | | | 714/6.2 |
| 2017/0272209 A1 * | 9/2017 | Yanovsky | G06F 3/065 |
| 2020/0097445 A1 * | 3/2020 | Grimaldi | G06F 3/0619 |
| 2020/0241960 A1 * | 7/2020 | Yanovsky | G06F 11/1044 |
| 2023/0104509 A1 * | 4/2023 | Tseng | G06F 11/1076 |
| | | | 711/114 |

\* cited by examiner

| Index value of the bits | 0 | 1 | 2 | 3 | ... | 8191 | 8192 | 8193 | ... | 9151 |
|---|---|---|---|---|---|---|---|---|---|---|
| Counts of bit value 0 | 10 | 8 | 1 | 6 | ... | 0 | 10 | 3 | ... | 9 |
| Counts of bit value 1 | 0 | 2 | 9 | 4 | ... | 10 | 0 | 7 | ... | 1 |

FIG. 4

MEMORY CONTROLLER AND DATA PROCESSING METHOD

BACKGROUND OF THE INVENTION

1. Field of the Invention

The invention relates to a data processing method for enhancing error correction performance of a memory device and the associated memory controller.

2. Description of the Prior Art

Along with the growth of coding technology, many kinds of error correction codes that can be used in the error correction code engine of memory devices have been developed, and the error correction capabilities of the error correction codes are also different. Generally, the stronger the error correction capability, the more expensive the price of the error correction code engine, because it is usually developed by using the error correction code with more complex design and needs stronger computation capability. However, considering to the cost, the error correction codes with relatively weak error correction capability are still widely used.

For example, the Bose, Chaudhuri, and Hocquenghem (BCH) code is widely used as the error correction code of the storage devices having a relative slow speed (such as the Universal Serial Bus (USB) flash drives), since it has the advantages of simple design, low cost and small size. However, the error correction capability of BCH codes is limited. As an example, for the same number of data bits, the number of error bits that can be corrected by the BCH code is usually lower than that of other higher-order error correction codes.

In order to further enhance error correction performance in the products using the error correction codes with relatively weak error correction capability, data processing methods and the associated memory controllers to enhance the error correction performance of memory devices are proposed.

SUMMARY OF THE INVENTION

It is an objective of the invention to enhance error correction performance of memory devices.

According to an embodiment of the invention, a memory controller coupled to a memory device for controlling access operations of the memory device comprises an error correction code engine, a buffer memory and a microprocessor. The error correction code engine is configured to encode data to be written to the memory device and decode data read from the memory device. The buffer memory is configured to provide data buffering. The microprocessor is configured to perform a repeated read operation on the memory device in response to a first decoding result of predetermined data to obtain a plurality of read results of a data chunk of the memory device comprising the predetermined data. The data chunk comprises a plurality of bits and the read results are stored in the buffer memory. The microprocessor is further configured to perform a data reconstruction and error correction procedure according to the read results of the data chunk. The data reconstruction and error correction procedure comprises an operation of data reconstruction and an operation of error correction. In the operation of data reconstruction, the microprocessor determines a bit value corresponding to each bit in the data chunk according to the read results of the data chunk to generate a reconstructed data chunk, and in the operation of error correction, the microprocessor provides the reconstructed data chunk to the error correction code engine to obtain a second decoding result of the predetermined data.

According to another embodiment of the invention, a data processing method, performed by a memory controller coupled to a memory device comprises: performing a repeated read operation on the memory device in response to a first decoding result of predetermined data to obtain a plurality of read results of a data chunk of the memory device comprising the predetermined data, wherein the data chunk comprises a plurality of bits and the read results are stored in a buffer memory of the memory controller; and performing a data reconstruction and error correction procedure according to the read results of the data chunk to obtain a second decoding result of the predetermined data. The step of performing the data reconstruction and error correction procedure according to the read results of the data chunk further comprises: determining a bit value corresponding to each bit in the data chunk according to the read results of the data chunk to generate a reconstructed data chunk; and providing the reconstructed data chunk to an error correction code engine of the memory controller to obtain a second decoding result of the predetermined data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 shows an exemplary statistics table regarding the bit values of each bit obtained by manually read according to an embodiment of the invention.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
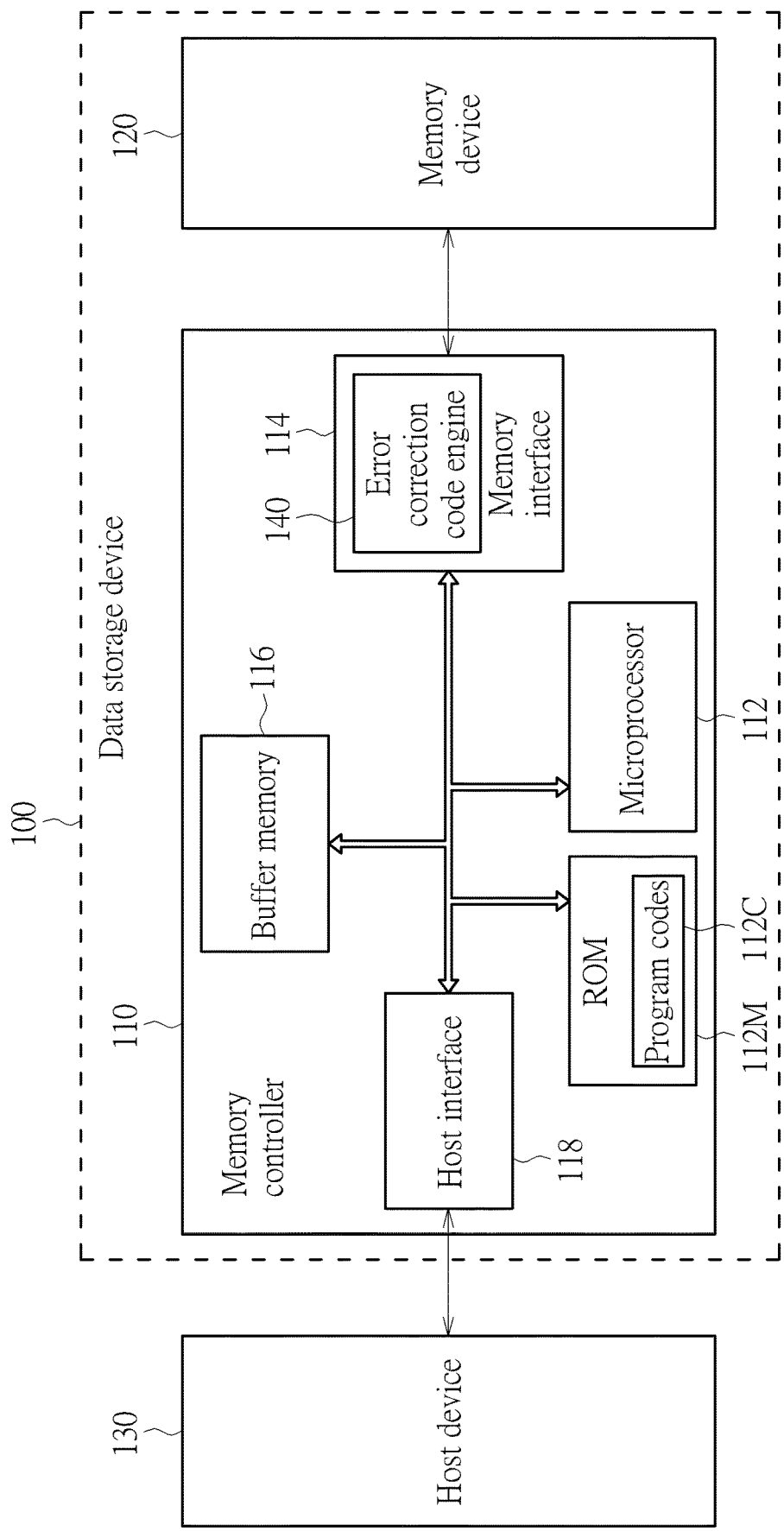
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the host device 130 may issue commands, such as the read command or the write command, to the data storage device 100, so as to access the data stored in the memory device 120, or the host device 130 may issue commands to further control or manage the data storage device 100.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an error correction code engine 140. The error correction code engine 140 may comprise an internal data buffer (not shown in FIG. 1) for buffering data, so as to facilitate the error correction code engine 140 to perform encoding and decoding operations on the data. In the write procedure to write data into the memory device 120, the error correction code engine 140 encodes the data to be written to the memory device 120, such as performing error correction code (ECC) encoding on the data to generate additional parity bits. In the read procedure to read data from the memory device 120, the error correction code engine 140 decodes the data read from the memory device 120 to check and correct the error bits in the data when the error is correctable (as an example, the number of error bits in the data does not exceed the upper limit of the number of correctable error bits of the error correction code engine 140).

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 for providing data buffering may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard, the USB flash drives, or the likes), and the host device 130 may be an electronic device, such as a mobile phone, a notebook computer, a desktop computer . . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

As described above, in order to enhance the error correction performance of the data storage device 100, in the embodiments of the invention, the memory controllers and the data processing methods for enhancing error correction performance of a memory device are proposed, and which are implemented by recombining the original content of the read data and performing the error correction operation again in one or more attempts to successfully decode the data.

Figure 2:
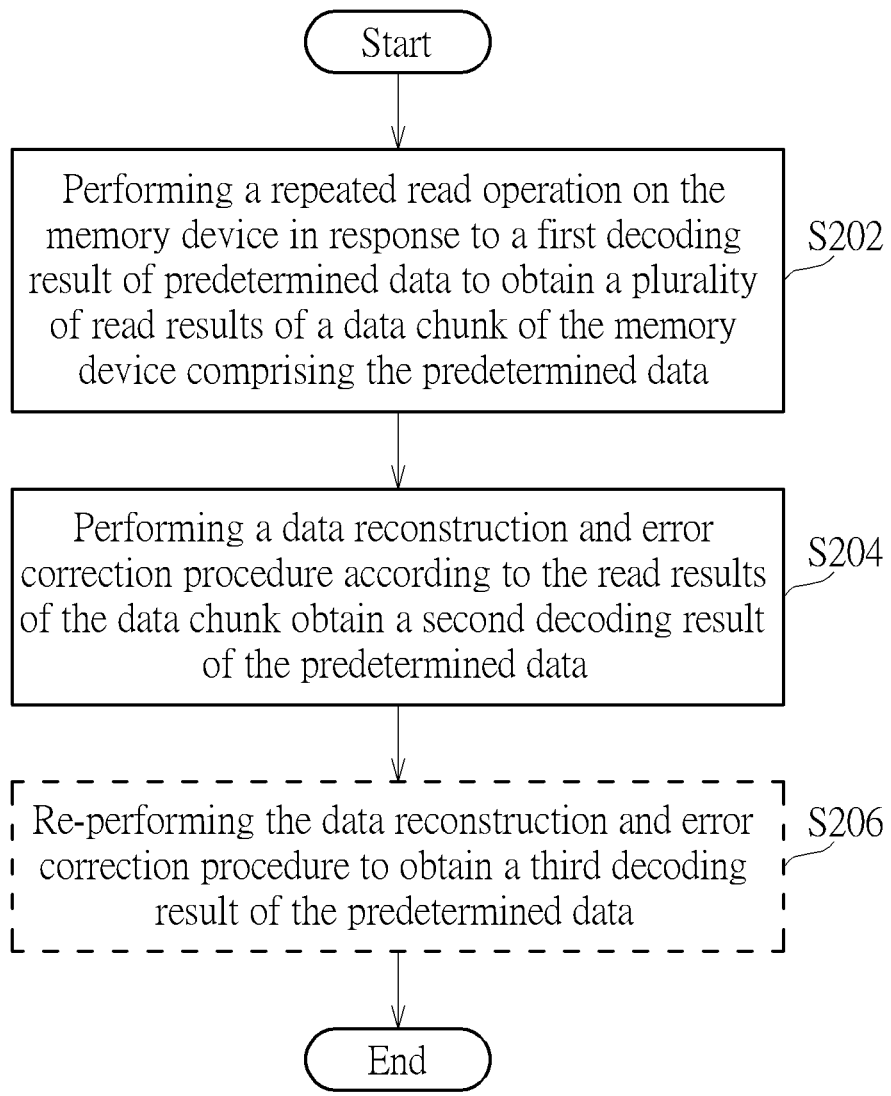
FIG. 2 shows an exemplary flowchart of a data processing method according to an embodiment of the invention.

FIG. 2 shows an exemplary flowchart of a data processing method according to an embodiment of the invention. The proposed data processing method may be performed by the memory controller 110 and may comprise the following steps:

Step S202: Performing a repeated read operation on the memory device 120 in response to a first decoding result of predetermined data to obtain a plurality of read results of a data chunk of the memory device 120 comprising the predetermined data. In an embodiment of the invention, the repeated read operation may be triggered when the first decoding result of predetermined data is a result indicating error correction failure.

Step S204: Performing a data reconstruction and error correction procedure according to the read results of the data chunk obtain a second decoding result of the predetermined data. According to an embodiment of the invention, the data reconstruction and error correction procedure may comprise an operation of data reconstruction and an operation of error correction. In the operation of data reconstruction, the memory controller 110 may determine a bit value corresponding to each bit in the data chunk according to the read results of the data chunk to generate a reconstructed data chunk. In the operation of error correction, the memory controller 110 may provide the reconstructed data chunk to the error correction code engine 140 of the memory controller 110 to obtain a second decoding result of the predetermined data.

In the embodiment of the invention, the second decoding result may be a result indicating a successful error correction, or may be a result indicating error correction failure. When the second decoding result indicates that the error correction is successful, it means that the error bits in the predetermined data can all be detected and corrected back to the correct bit value. That is, the correct content of the predetermined data may be restored by the error correction code engine 140. On the other hand, when the second decoding result indicates that the error correction fails, it means that the number of error bits in the predetermined data still exceeds the upper limit of the correctable error bits of the error correction code engine 140, so the error correction code engine 140 is unable to successfully perform error correction on the currently reconstructed data chunk.

In the embodiments of the invention, when the second decoding result indicates that the error correction is successful, the memory controller 110 may end the current data processing flow. When the second decoding result indicates that the error correction fails, the memory controller 110 may further perform the following steps:

Step S206: re-performing the data reconstruction and error correction procedure to obtain a third decoding result of the predetermined data. Since step S206 is not an essential step, it is drawn by a dotted line in FIG. 2.

According to an embodiment of the invention, when the data reconstruction and error correction procedure is re-performed, the memory controller 110 may modify the bit value corresponding to at least one bit of the reconstructed data chunk according to one or more flip logics to regenerate the reconstructed data chunk, and provide the reconstructed data chunk which is the regenerated one to the error correction code engine 140 to obtain the third decoding result of the predetermined data.

Similarly, in the embodiment of the invention, if the third decoding result indicates that the error correction is successful, the memory controller 110 may end the current data processing flow. If the third decoding result indicates that the error correction fails, the memory controller 110 may perform step S206 again to obtain a fourth decoding result of the predetermined data, and so on.

Generally, when the memory controller 110 performs a read operation on the memory device 120 in response to a read command received from the host device 130 to read predetermined data, the memory controller 110 may access the memory device 120 through the memory interface 114 so as to read out the predetermined data, and the error correction code engine 140 may perform decoding processing on the read-out data. The decoding operation of the error correction code engine 140 may comprise detecting error bits in the predetermined data and attempting to correct the error bits in order to repair the errors that have occurred when storing the predetermined data in the memory device 120. If the number of error bits in the predetermined data does not exceed the upper limit of the number of correctable error bits of the error correction code engine 140, the error correction code engine 140 is able to successfully repair the error bits in the predetermined data and restore the correct content of the predetermined data. If the number of error bits in the predetermined data exceeds the upper limit of the correctable error bits of the error correction code engine 140, it means that an Uncorrectable ECC (UECC) Error occurs, and the error correction code engine 140 is unable determine the correct content of the predetermined data, so that the decoding result is set to the one indicating that error correction failure.

In the existing design, when the error correction failure occurs, the memory controller 110 will directly report the error correction failure (ECC Failure) to the host device 130, and provide the read content of the predetermined data to the host device 130. Since the memory controller 110 is unable to determine which bits in the predetermined data are error bits, the memory controller 110 is unable to repair the error bits in the predetermined data as well. Thus, the memory controller 110 can only provide the read result of the data containing many unknown error bits to the host device 130.

In order to solve the above-mentioned problems, especially for the purpose to enhance the error correction performance in a product using an error correction code with relatively weak error correction capability, the aforementioned data processing method and the associated memory controller are proposed. The memory controller may try to successfully decode the data by reconstructing the original content of the read data and re-performing error correction. More details will be discussed in the following paragraph.

Figure 3:
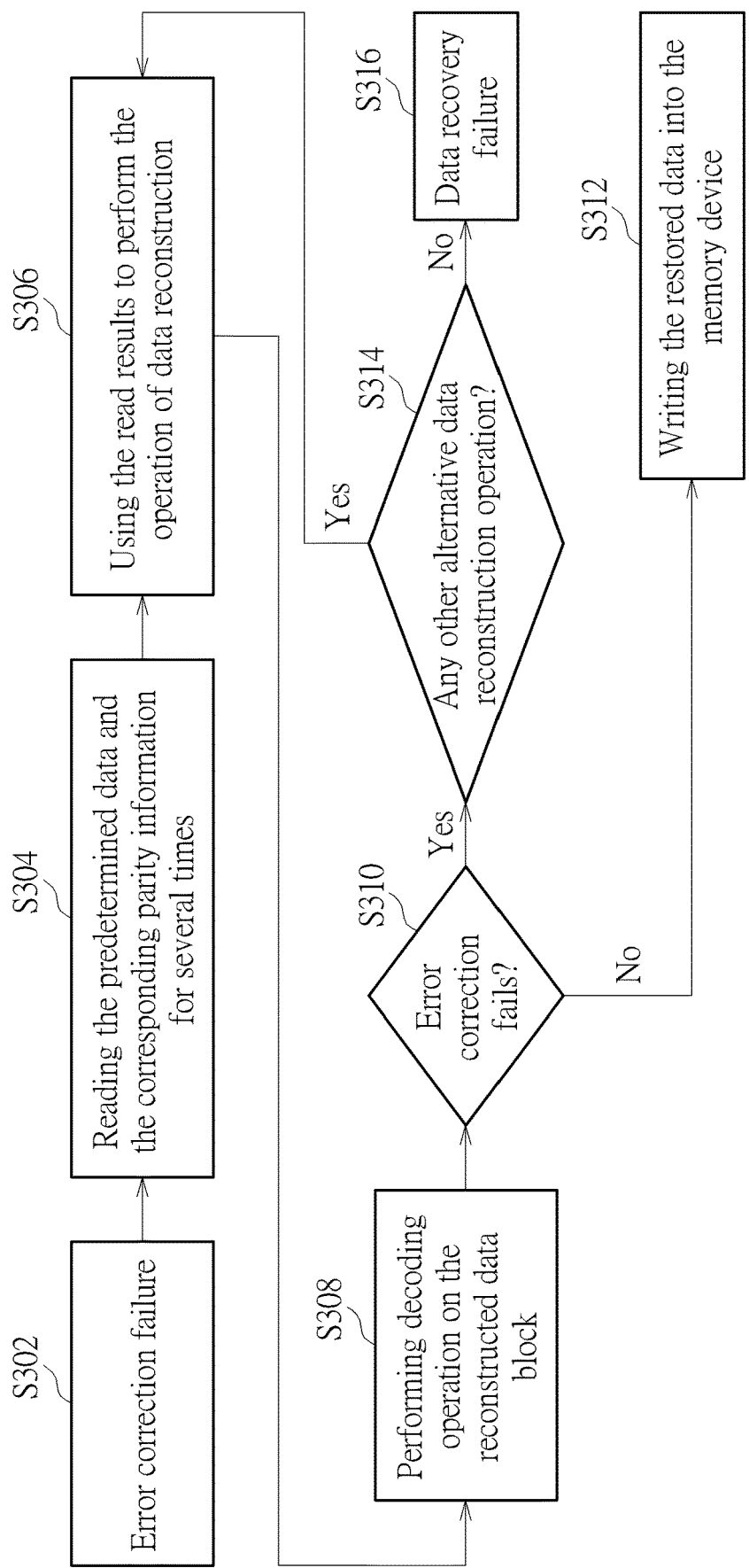
FIG. 3 shows an exemplary data processing flow according to an embodiment of the invention.

FIG. 3 shows an exemplary data processing flow according to an embodiment of the invention. In the embodiments of the invention, the data processing flow in which the aforementioned data processing method is applied may be started from the state of error correction failure (ECC Failure), but different from the existing design, the error correction failure is not reported to the host device 130 at this time. Assuming that the host device 130 issues a read command to read predetermined data with a size of one kilobyte (KB), the memory controller 110 accesses the memory device 120 in response to the received read command to attempt to read the predetermined data. When ECC Failure has occurred in the read predetermined data (Step S302), the microprocessor 112 of the memory controller 110 will manually perform a repeated read operation to read a data chunk comprising the predetermined data for several times (Step S304).

In an embodiment of the invention, the data chunk may comprise a plurality of bits, and the content of the data chunk may comprise the predetermined data and parity information corresponding to the predetermined data, wherein the parity information is the information generated by the error correction code engine 140 when writing the predetermined data to the memory device 120 to facilitate the error correction to be taken place in the future. Therefore, the data chunk read by the microprocessor 112 in step S304 may comprise a plurality of data bits of the predetermined data and one or more bits (parity bits) of the parity information corresponding to the predetermined data. For example, the microprocessor 112 may read the predetermined data and the corresponding parity information N times in step S304 to obtain N read results, where N is a positive integer greater than 1.

In the embodiment of the invention, the aforementioned manual reading operation or the reading operation performed manually refers to that the microprocessor 112 will skip the error correction operation of the error correction code engine 140 when reading the memory device 120. Therefore, the data obtained by the microprocessor 112 is the most original read result (i.e., the raw data) of the predetermined data and its parity information. That is, a read result that has not been decoded by the error correction code engine 140 or that has not been corrected by the error correction code engine 140.

Generally, when activating the memory controller 110 for the first time, the setting value related to the error correction code is written into the system data block of the memory device 120, wherein the system data block is used to store the data required for the memory controller 110 to operate. In the initialization procedure of the data storage device 100, the memory controller 110 may set the corresponding control module, for example, a flash memory control module generated by the microprocessor 112 by executing the software or firmware code for controlling the memory device 120, according to the content stored in the system data block. As an example, the microprocessor 112 may set the length of parity bits for the flash memory control module according to the content stored in the system data block.

Assume that the error correction code engine 140 has generated additional 120 Bytes of parity information (or called parity bits) in a previous write operation to write predetermined data with a size of 1 KB to the memory device 120, the 120 Bytes parity information will be written into the memory device 120 together with the 1 KB predetermined data.

When performing a non-manual read operation (i.e., a general read operation), for example, the aforementioned read operation in which the memory controller 110 reads predetermined data in response to a read command received from the host device 130, the microprocessor 112 will issue a read command to the memory device 120 through the flash memory control module, specify the start address of the read operation in the read command, and set the read length to be (1 KB+120 B), so as to read the predetermined data and its corresponding parity information together. In response to the read command, the memory device 120 returns the read data to the error correction code engine 140. The read data is temporarily stored in the internal data buffer of the error correction code engine 140, and the error correction code engine 140 performs decoding operations on the data. After the decoding is completed, no matter whether the decoding result is that error correction is successful or the error correction fails, the error correction code engine 140 will discard the 120B parity information, and only transmit the 1 KB predetermined data (if there are some error bits in predetermined data and the error bits are correctable, it will be the corrected predetermined data) to the buffer memory 116 of the memory controller 110, which is then transmitted to the host device 130 by the memory controller 110.

When performing the manual read operation, the microprocessor 112 will also issue a read command to the memory device 120 through the flash memory control module, and specify the start address of the read operation in the read command, and set the read length to be (1 KB+120 B), so as to read the predetermined data and its corresponding parity information together, but at this time, the microprocessor 112 will make the decoding function of the error correction code engine 140 not work, or disable the decoding function of the error correction code engine 140. In response to the read command, the memory device 120 will return the read data to the error correction code engine 140, and the (1 KB+120 B) read data temporarily stored in the internal data buffer of the error correction code engine 140 will be directly sent to the buffer memory 116 of the memory controller 110. Therefore, when performing a normal read operation, the error correction code engine 140 only transfers the read predetermined data to the buffer memory 116, but when performing a manual read operation, the error correction code engine 140 transfers both the read predetermined data and its corresponding parity information to the buffer memory 116.

According to an embodiment of the invention, the error correcting engine 140 may be disabled during the repeated read operation. For example, the error correction code engine 140 may be enabled by default, and the microprocessor 112 may temporarily disable the error correction code engine 140 by setting the corresponding register during the period when it is required to perform the repeated read operation (that is, during the period when performing the manual read operations for several times as mentioned above). According to another embodiment of the invention, the microprocessor 112 may also temporarily disable the error correction code engine 140 during the period when it is required to perform the repeated read operation by other setting methods, or make the decoding function of the error correction code engine 140 not work during the period when it is required to perform the repeated read operation.

According to an embodiment of the invention, in step S304, the microprocessor 112 manually performs the repeated read operations for N times on the data chunk comprising the predetermined data and its corresponding parity information, so that each bit of the data chunk has corresponding N read results, and the N read results of each bit are stored in the buffer memory 116.

According to an embodiment of the invention, after obtaining N read results of each bit, the microprocessor 112 may use the read results to perform a data reconstruction operation (Step S306), so as to reconstruct the content of the predetermined data and its corresponding parity information. In step S306, the microprocessor 112 may further analyze the content of the read result of each bit, for example, accumulate, among the N times of read operation, the number of times that the bit value of a bit in the data chunk is determined as 1 (e.g., the counts of bit value 1) and the number of times that the bit value of the bit is determined as 0 (e.g., the counts of bit value 0), so as to obtain the corresponding statistical result.

FIG. 4 shows an exemplary statistics table regarding the bit values of each bit obtained by manually read according to an embodiment of the invention. In the statistics table 400, the bits are discriminated from each other by assigning different index values, such as the index values 0~9151 shown in the table, where the $0·8191^{th}$ bits are the content of the predetermined data (in this example, the size of the predetermined data is 8 KB), and the $8192^{th}$ to $9151^{th}$ bits are the parity bits corresponding to the predetermined data.

According to an embodiment of the invention, in the operation of data reconstruction, the microprocessor 112 may be configured to select a majority from the corresponding N read results of each bit as the bit value corresponding to the bit. Taking the statistics table 400 as an example, since the read results of the bit value 0 are the majority among the 10 read results of the 0th, 1st, and 3rd bits, the microprocessor 112 may set the bit value of the $0^{th}$, $1^{st,\ and}$ $3^{rd}$ bits to 0 when reconstructing the $0^{th}$, $1^{st}$, and $3^{rd}$ bits. Similarly, since the read result of the bit value 1 is the majority among the 10 read results of the $2^{nd}$ bit, the microprocessor 112 may set the bit value of the $2^{nd}$ bit to 1 when reconstructing the $2^{nd}$ bit. Reconstruction of the remaining bits may be deduced by analogy. The microprocessor 112 may determine a bit value corresponding to each bit in the data chunk based on this rule, so as to generate a reconstructed data chunk. It should be noted that the invention is not limited to the way of reconstructing the data chunk by selecting the majority. As an example, in other embodiments of the invention, the microprocessor 112 may also set the bit value of a portion of bits to the minority among the N read results of the bits.

Next, the microprocessor 112 may provide the reconstructed data chunk to the error correction code engine 140, and the error correction code engine 140 may perform the decoding operation for error correction on the reconstructed data block (step S308). In an embodiment of the invention, the error correction code engine 140 may be restored to the enabled state or the decoding function of the error correction code engine 140 may be resumed by the microprocessor 112 during the period when the repeated read operation is not performed.

The microprocessor 112 may determine whether the decoding result obtained in step S308 is still an error correction failure (step S310). If not, it is indicated that the error correction is successful, and the microprocessor 112 may write the data restored or recovered by the error correction code engine 140 back into the memory device 120 (step S312) so as to preserve the correct content of the predetermined data. According to an embodiment of the invention, the microprocessor 112 may write the recovered data back to the memory device 120 through a data update operation. For example, the microprocessor 112 may regard the data recovered by the error correction code engine 140 as the updated data of the logical address corresponding to the predetermined data, and store it in the memory device 120. For the next time the host device 130 wants to access the content of the data corresponding to this logical address, the correct content will be read.

As described above, after the decoding is completed, the error correction code engine 140 will pass the predetermined data (for the case when the error bits in the predetermined data are correctable, it will be the corrected predetermined data or the aforementioned restored data) to the buffer memory 116 of the memory controller 110. Therefore, the microprocessor 112 may write the data currently stored in the buffer memory 116 back to the memory device 120.

If the decoding result in step S308 is still a result indicating that error correction fails, the microprocessor 112 may further determine whether there are other alternative data reconstruction operations to choose from (step S314). In the embodiment of the invention, the data reconstruction operation performed in step S204 or the data reconstruction operation performed when entering the step S306 for the first time may be a default data reconstruction operation, and the proposed data processing method may design one or more alternative data reconstruction operation to be provided when re-performing the data reconstruction and error correction procedure is required (for example, as shown in FIG. 3, when the determination is "Yes" in step S310).

If the microprocessor 112 determines that there is no other alternative data reconstruction operation to choose from, the microprocessor 112 reports the result of error correction failure and data recovery failure to the host device 130 (step S316) (in FIG. 3, it is shown by data recovery failure so as to be discriminated from the error correction failure shown in step S302), and provides the read content of the predetermined data to the host device 130. If the microprocessor 112 determines that there is any alternative data reconstruction operation available, the flow may return to step S306 (or, in some embodiments, may return to step S304).

In the embodiment of the invention, since only the part relevant to the data reconstruction operation is different and the part relevant to the error correction operation is the same when re-performing the data reconstruction and error correction procedure, the following description will be focused on the data reconstruction operation.

According to an embodiment of the invention, when the data reconstruction and error correction procedure is re-performed, the microprocessor 112 may modify the bit value corresponding to at least one bit of the data chunk based on the read result of the previously acquired data chunk and the previously reconstructed data chunk according to one or more flip logics, so as to regenerate the reconstructed data chunk. The aforementioned flip logic may be the logical condition for selecting a bit whose bit value can be flipped (or, changed, toggled or inversed) (for example, flipping or changing a previously set bit value from 0 to 1, or flipping or changing a previously set bit value from 1 to 0).

According to an embodiment of the invention, the flip logic may be the logical condition of that the probability of determining a value of a bit as 0 and the probability of determining the value of the bit as 1 are similar or close, or may be the logical condition of that a difference between the number of times of determining a value of a bit as 0 and the number of times of determining the value of the bit as 1 is less than a threshold.

As an example, the microprocessor 112 may pick up one or more bits having a difference less than a threshold, wherein the aforementioned difference is a difference between the number of times that the corresponding bit value is determined as 1 and the number of times that the corresponding bit value is determined as 0 in the N reads (e.g., the difference between the "counts of bit value 0" and the "counts of bit value 1" shown in the statistics table 400), and modify the bit value corresponding to at least one of the picked up bit(s), so as to regenerate the reconstructed data chunk.

Taking the statistics table 400 as an example, assuming that the threshold is set to 3 when the data reconstruction and error correction procedure is re-performed for the first time, the microprocessor 112 may pick up at least the $3^{rd}$ bit whose bit value can be flipped (because the difference between the "counts of bit value 0" and the "counts of bit value 1" of the $3^{rd}$ bit is less than 3 (i.e., 6−4=2)). Since the bit value of the $3^{rd}$ bit was set to 0 in the previous data reconstruction and error correction procedure, when the data reconstruction and error correction procedure is re-performed for the first time, the microprocessor 112 may change the bit value of the $3^{rd}$ bit to 1. The microprocessor 112 may follow such a flip logic to pick up the bits whose bit values can be flipped and modify their bit values to regenerate the reconstructed data chunk.

According to another embodiment of the invention, the flip logic may also be set according to the properties of the memory device 120. For example, the flip logic may be a logical condition regarding whether a bit is stored in an error-prone storage location in the memory device 120. The microprocessor 112 may pick up one or more bits stored in the error-prone storage location of the memory device 120, and modify the corresponding bit value of at least one of the picked up bits to regenerate the reconstructed data chunk.

According to another embodiment of the invention, the alternative data reconstruction operation may also be designed to re-read the data chunk and reconstruct the data chunk. For example, the microprocessor 112 may continue to use the read voltage previously set and return to step S304 to manually perform the aforementioned repeated reading operation on the predetermined data again, and then perform the data reconstruction operation in step S306 according to the newly obtained read result. The result of modifying the bit value corresponding to at least one bit of the data chunk may also be achieved.

According to yet another embodiment of the invention, the alternative data reconstruction operation may be designed to re-read the data chunk after adjusting the read voltage, and then reconstruct the data chunk. For example, the microprocessor 112 may analyze the currently programmed voltage of the memory device 120 through the corresponding firmware to obtain a distribution chart of the programmed voltage, and determine a better read voltage according to the distribution of the programmed voltage. Then, the microprocessor 112 may return to step S304 to manually perform the aforementioned repeated read operation on the predetermined data again by using the newly determined read voltage, and perform the data reconstruction operation in step S306 according to the newly obtained read result, so as to have the opportunity to achieve the result of modifying the bit value corresponding to at least one bit of the data chunk.

In the embodiments of the invention, multiple read results are obtained by repeatedly reading the data and the corresponding parity information, and a read result with a higher probability of being correct will be extracted independently from the read results for each bit to reconstruct the data, so to improve the success rate of data restoring or data recovery operation of the error correction code engine 140. Assuming that the maximum number of correctable error bits of the error correction code engine 140 is 60 bits, and in a certain read operation, the number of error bits in the data chunk containing the predetermined data is 70 bits and a result of error correction failure is obtained. In this case, by applying the proposed data processing method, if there are at least 10 bits having the bit values being reconstructed (or, flipped) to the correct values in the operation of data reconstruction or in the additional flipping operation, the decoding result of the predetermined data may no longer be error correction failure (that is, will become a result indicating error correction successful). Therefore, by applying the proposed data processing method, the probability of correcting data with errors is greatly increased, thereby effectively improving the error correction performance of the memory device. In particular, for a memory device equipped with an error correction code engine having relatively weak error correction capability, not only the error correction performance of the memory device is greatly improved, but also the cost of the memory device is reduced accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory controller, coupled to a memory device for controlling access operations of the memory device, comprising:
    an error correction code engine, configured to encode data to be written to the memory device and decode data read from the memory device;
    a buffer memory, configured to provide data buffering; and
    a microprocessor, configured to perform a repeated read operation on the memory device in response to a first decoding result of predetermined data to obtain a plurality of read results of a data chunk of the memory device comprising the predetermined data, wherein the data chunk comprises a plurality of bits and the read results are stored in the buffer memory, and
    the microprocessor is further configured to perform a data reconstruction and error correction procedure according to the read results of the data chunk, wherein the data reconstruction and error correction procedure comprises an operation of data reconstruction and an operation of error correction, in the operation of data reconstruction, the microprocessor determines a bit value corresponding to each bit in the data chunk according to the read results of the data chunk to generate a reconstructed data chunk, and in the operation of error correction, the microprocessor provides the reconstructed data chunk to the error correction code engine to obtain a second decoding result of the predetermined data;
    wherein the read results of the data chunk are read results that have not been decoded by the error correction code engine.

2. The memory controller as claimed in claim 1, wherein the first decoding result of the predetermined data is a result indicating error correction failure.

3. The memory controller as claimed in claim 1, wherein content of the data chunk comprises the predetermined data and parity information corresponding to the predetermined data.

4. The memory controller as claimed in claim 1, wherein the error correction code engine is disabled during performance of the repeated read operation.

5. The memory controller as claimed in claim 1, wherein in the operation of data reconstruction, the microprocessor is configured to select a majority from the corresponding read results of each bit as the bit value corresponding to the bit.

6. The memory controller as claimed in claim 1, wherein when the second decoding result of the predetermined data is a result indicating error correction failure, the microprocessor is configured to re-perform the data reconstruction and error correction procedure, and when re-performing the data reconstruction and error correction procedure, the microprocessor is configured to modify the bit value corresponding to at least one bit of the reconstructed data chunk according to the read results of the data chunk to regenerate the reconstructed data chunk and provide the reconstructed data chunk which is the regenerated one to the error correction code engine to obtain a third decoding result of the predetermined data.

7. A data processing method, performed by a memory controller coupled to a memory device, comprising:
  performing a repeated read operation on the memory device in response to a first decoding result of predetermined data to obtain a plurality of read results of a data chunk of the memory device comprising the predetermined data, wherein the data chunk comprises a plurality of bits and the read results are stored in a buffer memory of the memory controller; and
  performing a data reconstruction and error correction procedure according to the read results of the data chunk to obtain a second decoding result of the predetermined data,
  wherein the step of performing the data reconstruction and error correction procedure according to the read results of the data chunk further comprises:
  determining a bit value corresponding to each bit in the data chunk according to the read results of the data chunk to generate a reconstructed data chunk; and
  providing the reconstructed data chunk to an error correction code engine of the memory controller to obtain a second decoding result of the predetermined data;
  wherein the read results of the data chunk are read results that have not been decoded by the error correction code engine.

8. The data processing method as claimed in claim 7, wherein the first decoding result of the predetermined data is a result indicating error correction failure.

9. The data processing method as claimed in claim 7, wherein content of the data chunk comprises the predetermined data and parity information corresponding to the predetermined data.

10. The data processing method as claimed in claim 7, further comprising:
  disabling the error correction code engine during performance of the repeated read operation.

11. The data processing method as claimed in claim 7, wherein the step of determining the bit value corresponding to each bit in the data chunk according to the read results of the data chunk to generate the reconstructed data chunk further comprises:
  selecting a majority from the corresponding read results of each bit as the bit value corresponding to the bit.

12. The data processing method as claimed in claim 7, wherein when the second decoding result of the predetermined data is a result indicating error correction failure, the data processing method further comprises:
  re-performing the data reconstruction and error correction procedure to obtain a third decoding result of the predetermined data,
  wherein the step of re-performing the data reconstruction and error correction procedure further comprises:
  modifying the bit value corresponding to at least one bit of the reconstructed data chunk according to the read results of the data chunk to regenerate the reconstructed data chunk; and
  providing the reconstructed data chunk which is the regenerated one to the error correction code engine to obtain the third decoding result of the predetermined data.

* * * * *